(12) United States Patent
Stridsberg

(10) Patent No.: US 6,885,162 B2
(45) Date of Patent: Apr. 26, 2005

(54) HIGH RELIABILITY MOTOR SYSTEM

(75) Inventor: Lennart Stridsberg, Stockholm (SE)

(73) Assignee: Stridsberg Innovation AB, Stockholm (SE)

( * ) Notice: Subject to any disclaimer, the term of this patent is extended or adjusted under 35 U.S.C. 154(b) by 0 days.

(21) Appl. No.: 10/467,570

(22) PCT Filed: Feb. 8, 2002

(86) PCT No.: PCT/SE02/00233

§ 371 (c)(1),
(2), (4) Date: Nov. 10, 2003

(87) PCT Pub. No.: WO02/063760

PCT Pub. Date: Aug. 15, 2002

(65) Prior Publication Data

US 2004/0119427 A1 Jun. 24, 2004

(30) Foreign Application Priority Data

Feb. 8, 2001 (SE) .............................................. 0100432
Feb. 19, 2001 (SE) .............................................. 0100594

(51) Int. Cl.$^7$ ................................................ H02P 7/00
(52) U.S. Cl. ...................... 318/254; 318/138; 318/439; 318/801; 310/184; 310/185; 310/186
(58) Field of Search ................................ 318/254, 135, 318/138, 439; 310/184, 185, 186

(56) References Cited

U.S. PATENT DOCUMENTS

| | | | |
|---|---|---|---|
| 3,566,226 A | * | 2/1971 | Tamm .......................... 318/768 |
| 4,161,680 A | * | 7/1979 | Akamatsu .................... 318/722 |
| 4,319,176 A | * | 3/1982 | Akamatsu .................... 318/716 |
| 4,434,389 A | | 2/1984 | Langley et al. ............. 318/254 |
| 4,896,088 A | * | 1/1990 | Jahns .......................... 318/696 |
| 5,212,419 A | * | 5/1993 | Fisher et al. ................. 310/254 |
| 5,442,250 A | * | 8/1995 | Stridsberg ................... 310/186 |
| 5,751,089 A | * | 5/1998 | Stridsberg ................... 310/266 |
| 6,054,172 A | * | 4/2000 | Robinson et al. .......... 427/97.2 |
| 6,525,504 B1 | * | 2/2003 | Nygren et al. .............. 318/700 |

* cited by examiner

Primary Examiner—Rita Leykin
(74) Attorney, Agent, or Firm—Birch Stewart Kolasch & Birch, LLP

(57) ABSTRACT

A brushless electric motor system comprises a rotor and a stator comprising poles. Electrical phase windings have coils (U1–6, V1–6, W1–6) wound around the poles. Power switches (T1–24) controlled by a control device supply electric current the windings from positive and negative rails connected to power supply. For each phase at least one group of four power switches arranged in a H-bridge configuration is provided. The coils of each phase winding are preferably divided into winding group (U1–3, Ua–6, V1–3, V4–6, W1–3, W4–6) and the electric conductor of each winding group is then electrically conductor of the other winding groups. Then four power switches arranged in an H-configuration is provided for each winding group. The use of power switches in H-bridge configurations allows the faulty windings or winding groups to be disabled and that the rest of the windings or coils can be used for driving the rotor, this giving the motor system a high reliability. The current supplied to other windings or winding groups can then be increased to compensate for the faulty group. The coil groups can be separated from other coil groups by unwound stator poles. Current sensors (303) can sense the current in each winding group and be used to detect whether the currents are too high. The sensed currents can be used to identify fault conditions in the system so that then suitable switches can be disabled, disconnecting a faulty winding group.

16 Claims, 6 Drawing Sheets

HIGH RELIABILITY MOTOR SYSTEM

This application is the national phase under 35 U.S.C. §371 of PCT International Application No. PCT/SE02/00233 which has an International filing date of Feb. 8, 2002, which designated the United States of America.

TECHNICAL FIELD

The present invention generally relates to brushless electric motor systems having high reliability and to methods of designing such motor systems.

BACKGROUND OF THE INVENTION

Brushless electric motor systems have several failure modes, some of which are illustrated in FIG. 1. The illustrated motor has three stator phases 101, 102 and 103. Each phase is illustrated as a coil having only two turns such as 104 and 105. The phase coils pass through slots in a laminated iron stator pack 106. One end of each of the phase coils is connected to a common node at 107. The other ends 108, 109 and 110 of the phase coils are connected to a three phase bridge having six power switches 111, . . . , 116.

The fast switching of the transistors give high voltage ringing transients in the phase coils. This creates high local voltages specially where the phase windings cross each other on the way from one slot to another, and may create short circuit paths as illustrated at 117. The insulation against ground can also break as illustrated at 118. The insulation within a coil can fail as indicated at 119, creating a short circuit loop illustrated as a thicker line at 105. The transistors can fail to operate and then are in a permanent closed or open configuration.

All these failure modes will completely disable the operation of a conventional motor system.

SUMMARY OF THE INVENTION

It is an object of the invention to provide a brushless electric motor system having dramatically reduced risk of phase to phase shortages.

It is another object of the invention to provide a brushless electric motor system that is capable of delivering substantial torque or power even with a ground to phase shortage.

It is another object of the invention to provide a brushless electric motor system that is capable of delivering substantial torque or power even with a short circuit inside a phase winding.

It is another object of the invention to provide a brushless electric motor system that is capable of delivering substantial torque or power even with a permanently open power switch.

It is another object of the invention to provide a brushless electric motor system that is capable of delivering substantial torque or power even with a permanently shortened power switch.

It is another object of the invention to provide a brushless electric motor system that is capable of delivering almost full power over a long time even when various types of failure causes abnormal heating of winding parts.

The above objects are achieved by the invention, the characteristics of which appear from the appended claims.

The brushless electric motor system considered herein, that can be a rotational or linear motor, generally comprises a rotor or linear slide having north and south poles and a stator comprising poles, also called stator teeth, and electrical phase windings. Each phase winding includes a plurality of coils, each coil wound around an individual one of the stator poles. A switching network controlled by a controller or control device performs the electronic commutation. It comprises power switches, each power switch having one switch terminal connected to a pole or terminal of an electric power source and another switch terminal connected to an end of one of the coils. Each of the power switches thus either is closed, i.e. connects, as controlled by a control signal from the control device, the end of the associated coil to the respective pole or terminal of the electric power source, or is open, disconnecting the coil from the electric power source. The control device controls the switching network, in particular the power switches thereof, to supply the phase windings with electric current or power at times selected to achieve a torque or force on and thereby a movement of the rotor or linear slide. The coils of each phase winding are electrically insulated from coils in the other phases.

The switching network can for each phase comprise at least one group of four power switches that are arranged in an H-configuration and are connected between a positive conductor or rail connected to a positive pole of the power supply and a negative conductor or rail connected to a negative terminal of the power supply. The coils of each phase winding are divided into winding groups and then each winding group is electrically insulated from the other winding groups. The switching network can then for each winding group comprise four power switches arranged in an H-configuration between the positive conductor or rail and the negative conductor or rail. An individual control of the power supplied to the phase windings or coil groups hat is allowed by having the power switches and windings or coil groups connected to each other in this type of bridges, this furthermore allowing that windings or coil groups can be individually disconnected from the power supply in the case where there is some fault or failure of some component associated with the windings or coil groups. This allows that electric current can still be supplied to other windings or coil groups, Each coil of each one of the groups can be separated from the coils in the other group or groups by unwound stator poles to give an additional spatial electrical insulation between the groups. Each coil of each one of the groups can be connected to other coils in the same group and/or to the switching network through high current limiting devices that preferably are fuses. These features obviously enhance the reliability of the electric motor.

The control of currents in the windings or coil groups can use values obtained from current sensors sensing the current in each phase winding or in each winding group, in particular sensing whether the absolute values of the currents are too high.

The switching network and in particular the control device can thus be arranged to detect whether the magnitudes of the sensed switched currents exceed a safety level. The control device can then, by analyzing the sensed currents, identify various fault conditions that include shorts inside phase windings, shorts from phase windings to ground and failures of the power switches. It can then disable those of the switches that drive faulty phases or winding groups and use the still operating parts of the brushless motor system to ensure that the brushless motor system can operate to move the rotor or linear slide in spite of fault conditions albeit with a reduced peak performance.

The control device can then act according to a control method in which the performance of the motor system is optimized for fault conditions identified in system components. It can then use information from the temperature sensors to adjust, in particular increase, still controllable currents flowing through phase windings and/or coil groups so that a maximum output power/torque/force or a maximum performance in regard of the torque or force is obtained without surpassing predetermined temperature limits. The predetermined temperature limits used can be based on a relatively negligible risk for additional faults or failures of system components during an expected maximum time during which the brushless electric motor system must be able to operate after identifying one fault condition. These considerations involving an maximum time and predetermined temperature limits can be used in a method of designing an electric motor system exhibiting a high reliability.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
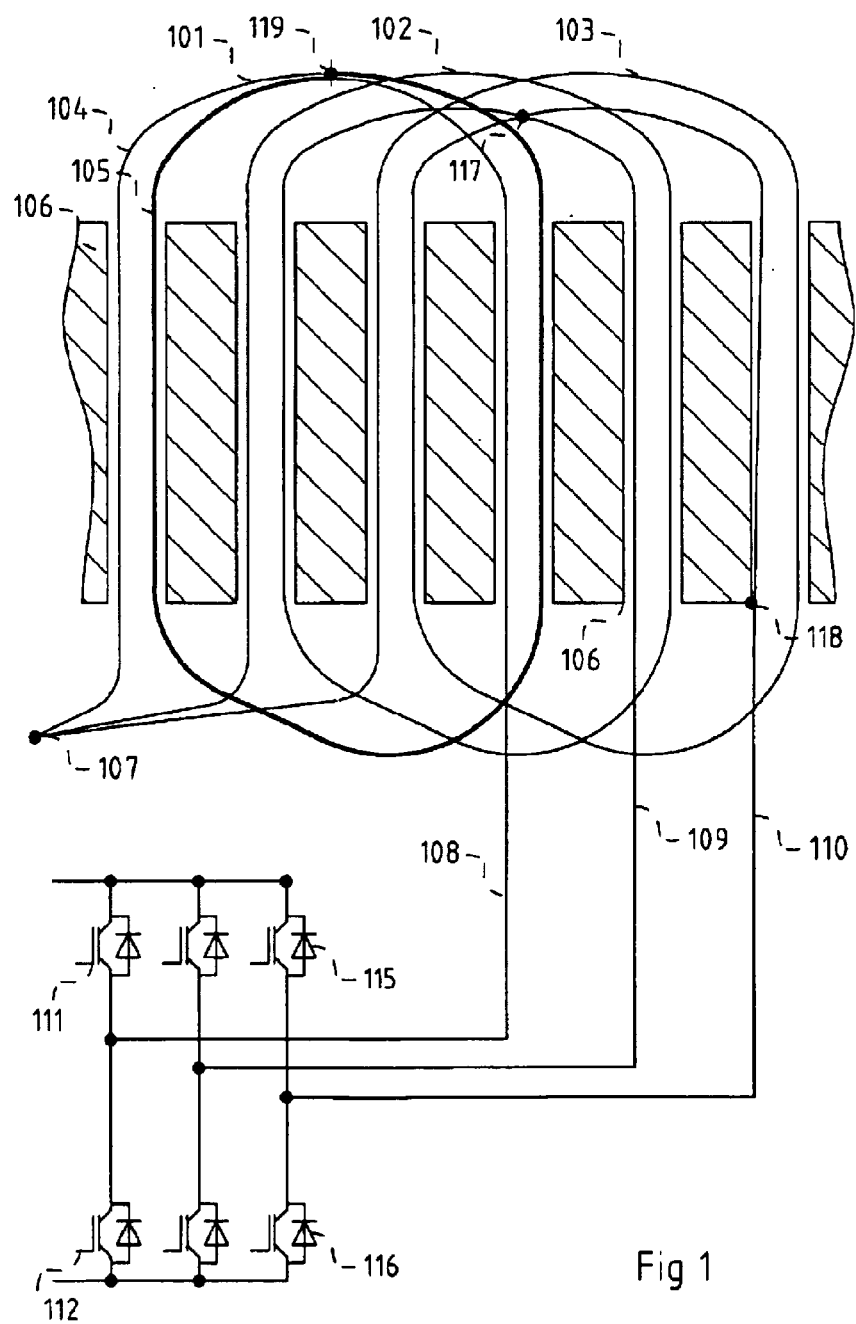
FIG. 1 is a schematic illustrating the configuration of electric windings of a conventional brushless electric motor system.

In FIG. 1 the principle layout of the electric windings and their connection in a conventional brushless electric motor is illustrated. The illustrated motor has three stator windings 101, 102 and 103 connected to three phases and arranged in slots between poles of a laminated iron stator pack 106, the poles projecting towards the rotation axis, not shown, of the motor. Each phase winding is illustrated as a coil having only two turns such as 104 and 105. All the phase coils have one end interconnected, at a common node 107. Any part of any winding is connected to all other parts of all windings through metallic conductors. The other ends 108, 109 and 110 of the phase coils are connected to a switching circuit, in particular to the interconnection nodes of pairs of power switches 111 and 112, 113 and 114, 115 and 116, the switches of each pair connected in series between two rails connected to a power supply, not shown.

Figure 2:
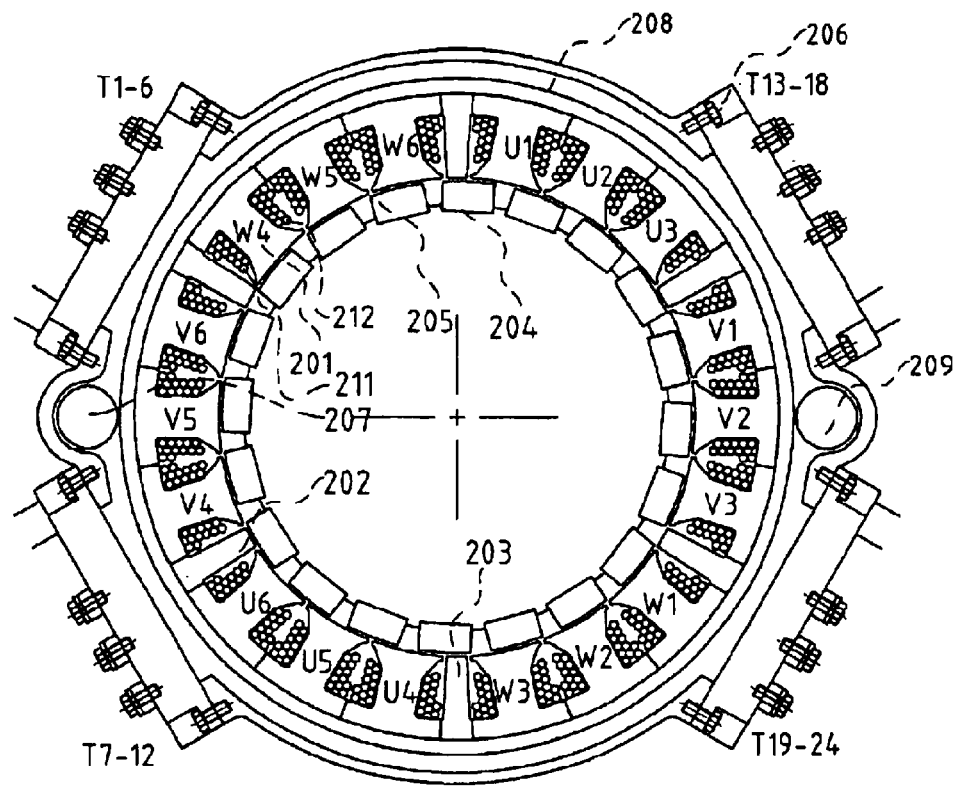
FIG. 2 is a sectional view of a brushless electric motor having high reliability.

In FIG. 2 a cross-section of a brushless electric motor system having a high reliability is shown. Unlike the motor of FIG. 1, the stator windings are divided into groups. The phase denoted by U has six coils U1–U6 divided into two groups U1–U3 and U4–U6, each group comprising three coils. The electric conductors of the coils of each phase winding group are connected in series with each other. The identifications of the coils are in the figure indicated on the laminated iron poles like 201 around which they are wound. Coil W4 is for example shown as sections 211 and 212. Then also the stator poles are divided in corresponding pole groups, each of the stator pole groups carrying the coils of an individual one of the phase winding groups. Each of the resulting six stator pole groups is insulated from the other groups in the sense that there is no metallic conductive connection between them. Each of these six stator pole groups, for instance the pole group carrying the winding group U4–U6, is separated from the adjacent groups, such as the pole groups carrying the coils V4–V6 and W1–W3, by two unwound stator poles such as 202 and 203 located at either side of the pole group. The unwound stator poles can as illustrated in the figure be narrower than the wound stator poles and thereby extend over a smaller angle at the circumference of the rotor. 20 rotor magnets like 204 and 205 are arranged at the circumference of the rotor.

The mechanical assembly shown in FIG. 2 permits a compact package with a reduced risk for cable and connection faults, as the connection between the motor and the power electronics system only includes electric lines for the supply voltage and for control signals. An arrangement for forced cooling is indicated as an input 207 of cooling air or fluid and channels such as 208 for the medium on its way to the outlet 209.

Alternatively, the motor can be cooled by ventilation air moving axially between the coils and around the magnets.

Figure 3:
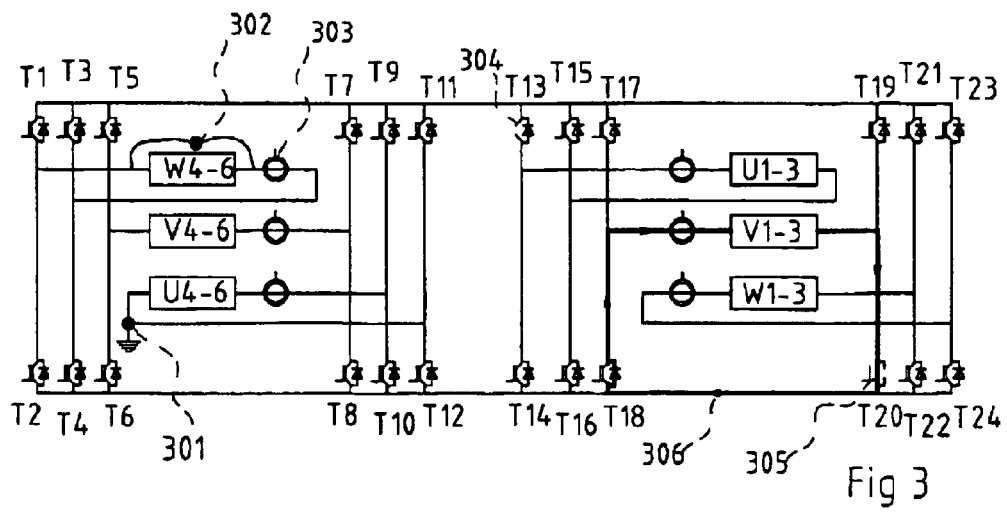
FIG. 3 is circuit diagram of the power electronics and phases of the motor of FIG. 2 in which various faults are indicated.

The circuit diagram of FIG. 3 shows the power switches and their connection to the windings of the motor shown in FIG. 2. The power switches comprise 4 modules each having 6 power switches or transistors T1, T2, . . . , T24, which often is advantageous as the large production volumes of 6-transistor modules make them economical. The 24 transistors are connected to act as 6H-bridges, each H-bridge including 4 transistors and driving one phase winding group. For example, the phase winding group W4–6 is driven by transistors T1–T4. One end of the electric conductor in each phase winding group, e.g. W4–6, is connected to the interconnection node of a first pair of the power switches such as T1 and T2 and the opposite end is connected to the interconnection node of a second pair of the power switches such as T3 and T4. The switches of each pair is connected in series between two rails connected to a power supply, not shown. The current through the windings of each pole group is checked by a current sensor such 303 for the phase winding group W4–6. Controlling a current and the intensity thereof flowing through a coil or an inductance such as the conductor of winding group using a 4 switch H-bridge and a current sensor is well known in the art.

Figure 4:
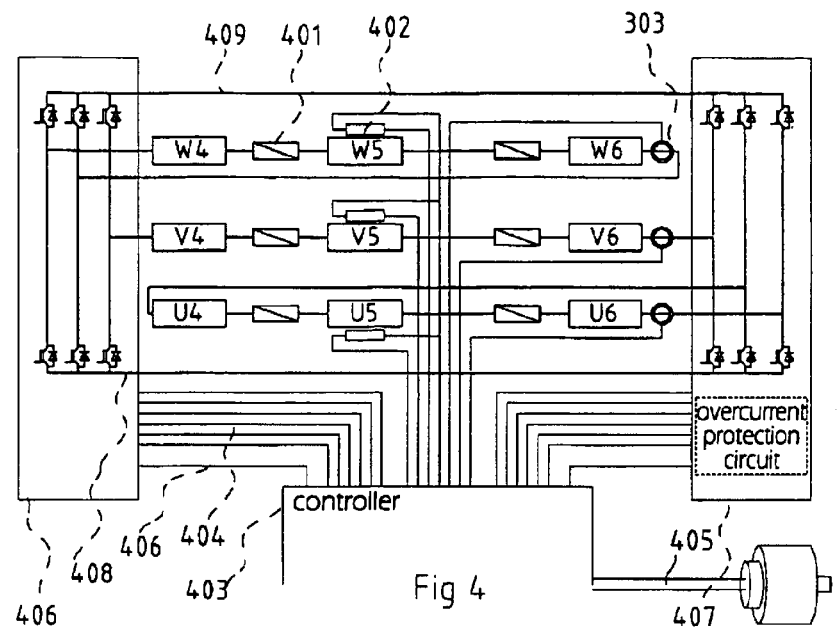
FIG. 4 is a detailed circuit diagram corresponding to half the circuit diagram of FIG. 3 and also showing detectors and a controller.

FIG. 4 is a more detailed circuit diagram of an improved version of the power and signaling connections of FIG. 3. Only half the system is shown. Slow fuses like 401 are inserted in series with the three coils in each phase winding group, e.g. as illustrated one slow fuse between each pair of adjacent coils, i.e. two fuses per phase winding group.

The power switches are encapsulated in hex switch assemblies 406 and 407, each switch assembly thus including six switches. A motor controller 403 controls the six switches in each assembly through control lines like 404. Many commercially available power switch assemblies contain safety sensors, not shown, that will disable one or all of the switches if the current flowing through anyone of the switches of the assembly becomes greater than a safety level. At the same time an alarm signal will be issued, for instance on a line 406, to the controller 403.

The controller 403 must have information on the angle position of the rotor in relation to the stator of the motor through some kind of position sensor such as Hall effect elements, an encoder or a resolver. This information is provided through lines 405. Information on the current intensities in the different phase winding groups are supplied through current sensors like 303, and information on the temperature in each phase winding are supplied by sensors like 402 to the controller 403. The sensors should preferably permit a rather high resolution, at least four bits, to permit a measurement of the coil temperature up to temperatures close to short term failure temperature of the winding insulation. Motor protection sensors often have almost binary characteristics, such as thermistors with a low resistance below 140° C. and a dramatically higher resistance above 150° C. Such sensors are not suitable for the more complex task of monitoring temperatures in motors that deliver power during serious fault conditions.

Some of the error modes of a brushless electric motor system have been indicated in FIG. 3. Some examples of the magnitude of lost performance, coil heating and failing torque will be given for a convection cooled motor of some 2 kW. Other motors sizes and other cooling systems will give different results.

A purpose of the invention is to provide a brushless electric motor system that is capable of delivering substantial output torque or output power even for a permanently open power switch. If a power switch such as T13 will be kept permanently passive by a fault shown as 304, all of the four switches T13–T16 should be disabled. In some applications, the functional switch pair T14–T15 could be used to provide some torque. This case is not discussed in the following description. Disabling T13–T16 will eliminate the current in the phase coils W4–W6. If the phase currents in the remaining pole groups are kept at normal values, the torque will vary between 100% and 66% of the torque from a normally operating motor.

Figure 6:
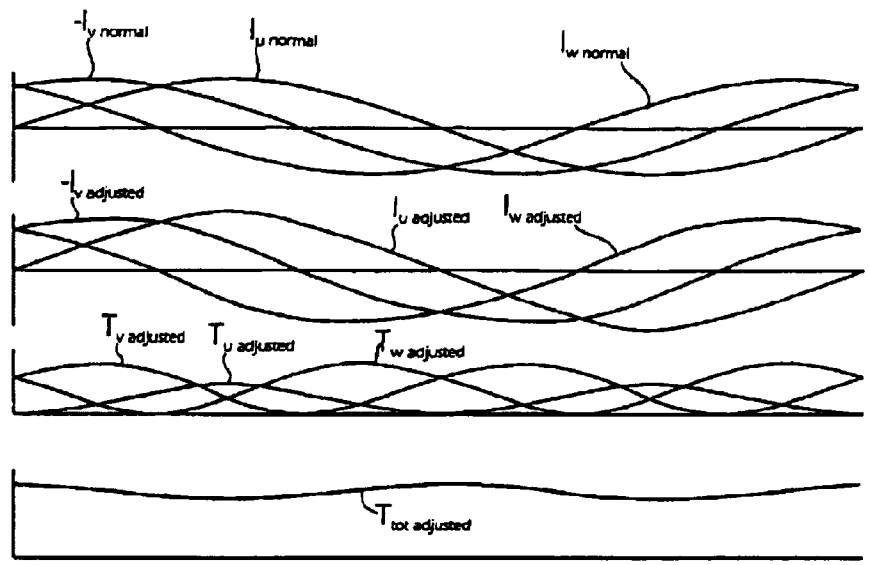
FIG. 6 is a diagram showing graphs of controlled currents and resulting torques in a motor system in which one winding group is disconnected, for a control method giving a maintained high total output torque.

In convection cooled motors, the thermal resistance between motor frame and the ambient is an important part of the thermal resistance between winding and ambient. In such cases the currents in the operating parts of the faulty motor can be increased almost to the level where the total copper loss from the faulty motor can be kept at the same level as for a correctly operating motor. One example of this is illustrated by the plots in the diagram of FIG. 6. In this example, one of the two U winding groups is disabled. The top graphs show the phase currents like $I_{u\_normal}$ in a normally operating motor. In the case shown below the top graphs, the current like $I_{u\_adjusted}$ in the remaining operating pole groups have been increased by a factor common for all phase winding groups that varies with the electric angle in such a way that the total copper loss in the active phases are identical to the total loss for a normally operating motor. This correction will cause the torque $T_{tot\_adjusted}$ to vary between 100% and 81.6% of that of a correctly operating motor as seen in the lower-most graph. The torques like $T_{w\_adjusted}$ from each phase are shown by the graphs in the middle of the diagram. The graphs of FIG. 6 illustrate the principle only. The optimal adjustment of the phase currents will depend on thermal and other characteristics of the motor system.

The adjustment of the phase current intensities is made by having the controller 403 control the power switches accordingly.

Figure 7:
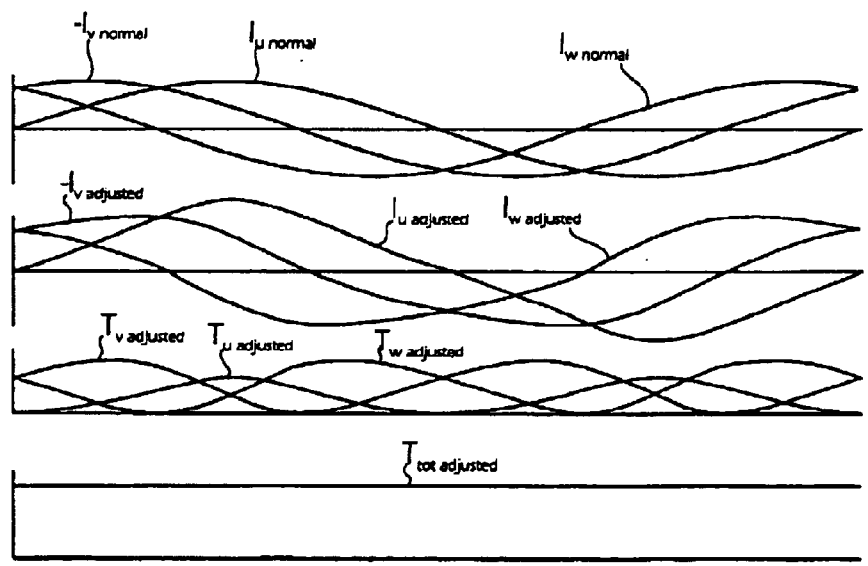
FIG. 7 is a diagram similar to that of FIG. 6 showing graphs for a different control method.

The strategy illustrated by the graphs of FIG. 6 comprising that the current intensities are adjusted to produce the same copper loss for all rotor angles is relevant for systems which partly operate at zero or very low speeds, for example for setting the angle of a control or guiding surface of an aircraft. The diagram of FIG. 7 illustrates a phase current adjustment for motors that always rotates at speeds for which the phase current frequency is so high that the thermal inertia of the stator coils dampens out the angle dependent variations of the heating. In such cases, the phase current adjustment can be made in such a way that the total copper losses over one turn is the same as that of a properly operating motor system. Assuming that a constant no-ripple torque is desired, that the thermal resistance from the motor to the ambient totally dominates over the thermal resistance between each stator pole and the motor casing, and that the torque constants are sinusoidal, this permits a smooth torque that is 90.6% of the torque of a correctly operating motor system. If the motor system is designed to have a torque margin of some 10.4%, the fall-out of a phase pole group would permit full required torque with negligible ripple.

For high speed loads such as fans or pumps, torque ripple is often irrelevant. In such cases the currents of the operational five pole groups can be increased by the square root of 6/5 or some 9%, giving a total power of 5/6×1.09=91.3% of normal power.

Another purpose of the invention is to provide a brushless electric motor system that is capable of delivering a substantial total torque or power even for a permanently shortened power switch. If a power switch such as T20 in FIG. 3 is kept permanently shorted as illustrated at 305, any attempt to switch on switch T19 will cause the conventional overcurrent protection circuit in a bridge such as 406 to disable at least switch T19. The bridge logic will also send an overcurrent alarm to the control processor though a protection fault line like 406. In the case where the over current alarm does not identify the individual switch, the processor could identify the source of the problem by selectively disable winding group after group until the switch causing the fault is identified. After finding that switch T19 always causes an overcurrent alarm while an activation of switch T20 does not, the processor can assume that switch T20 is permanently shorted. In the case where the negative rail, shown at 408 in FIG. 4, is at ground level, a short from the right end of coils V1–3 to ground will give the same results as a short inside the switch T20. A suitable action is to disable all the four transistors T17–T20. This will eliminate the controlled current in phase coils V1–3.

Figure 8:
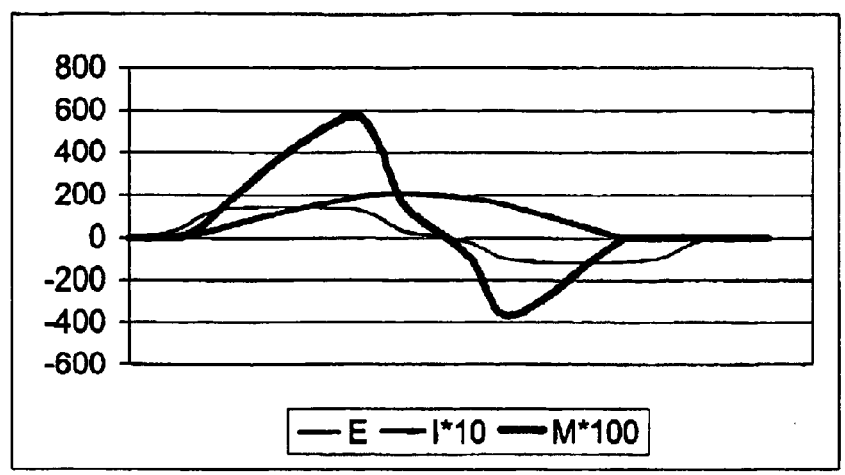
FIG. 8 is a diagram showing graphs of the emf E, the brake torque T and the current I in a current loop caused by a permanently shorted switch.

However, as the short 305 through transistor T20 always is conducting, an emf from the motor rotation that makes the left side of coils V1–3 negative will produce a current loop shown as 306 in FIG. 3. At higher speeds, the fault current shown as 306 can be several times the phase current for full nominal power load. For the motor type used as an example, this current will at higher speed cause a brake torque that has a peak value of the same magnitude of order as the normal full power of the motor. The average brake torque is however only some 10 to 20% of the normal full power of the motor as the fault current due to phase lag also gives substantial positive torque for other rotor angles. The brake torque is therefore not large enough to seriously degrade the performance of the motor system. At high speeds, where the error current through coils V1–V3 will be far higher that their full power current for normal operation, one of the slow fuses like 401 will break and eliminate the current through coils V1–V3. The current through coils V1–V3 could otherwise cause their temperature to quickly reach some 500° C., triggering further insulation breakdowns. The graphs of FIG. 8 show the emf E in coils V1–3, the brake torque T, and the current I for the example motor for the case where the power switch T20 is short-circuited and under the assumption that the insulation between turns in the coils has not broken at the high long term temperature of 512° C. and that no fuses like 401 have blown.

Another purpose of the invention is to provide a brushless electric motor system that has a dramatically reduced risk of phase to phase shortages. This is obtained by the fact that the windings of any phase like U4–U6 are separated from other phases by separation poles or balancing poles like 202 and 203.

Another purpose of the invention is to provide a brushless electric motor system that is capable of delivering substantial torque or power even for a ground to phase short. Such a failure is shown at 301 in FIG. 3. Assuming that the DC rails like 408 and 409 are not floating, this short will cause very large currents through transistors T11 or T12, thereby causing the conventional overcurrent protection circuit, not shown, to disable the bridge and send an alarm to the controller 403. In this case, an overcurrent alarm will be obtained as soon as any of the switches T11 and T12 are enabled even when switches T9 and T10 are disabled. This indicates a short to ground as indicated at 301. The controller 403 should thereafter disable all the four transistors T9–T12 driving the coils U4–U6.

Yet another purpose of the invention is to provide a brushless electric motor system that is capable of delivering substantial output torque or output power even for a short circuit inside a phase winding. This is illustrated by the short 302.

If the motor rotates, the emf caused by the rotor magnets produces current/s flowing in the shorted coil/s. This causes a brake torque which is negligible at low speeds but which at higher speeds will cause dramatic heating of the shorted parts. In a motor where phase windings are located adjacent to each other, this could cause the faulty phase to heat the insulation on neighboring phases to temperatures where its insulating properties are seriously reduced, thus creating one phase short to create temperatures that can cause shorts in other phases. This can result in that one phase short will create temperatures that cause shorts in other phases, thereby causing a total failure of the motor system. In the motor of FIG. 2, the intermediate poles such as 202 and 203 will dampen the heat transfer from a shorted pole to the adjacent phase windings. Therefore, an internal short in a phase will give a smaller and uneven torque, but will permit the system to continue to operate with a reduced output torque and/or at a reduced speeds.

Figure 9:
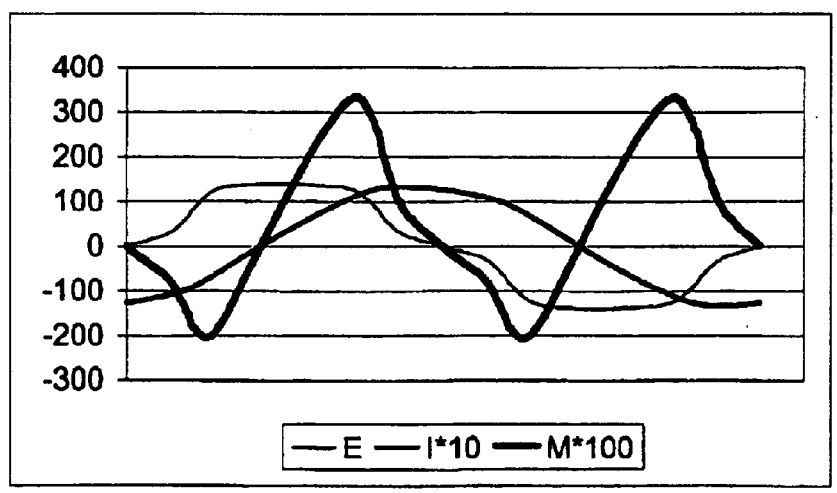
FIG. 9 is a diagram similar to that of FIG. 8 for a case where a group of three coils have been shorted.

If the short covers all the three coils in a phase winding group, as illustrated in FIG. 3, the result will be an overcurrent trip alarm as soon as both T1 and T4 or T2 and T3 are enabled. At high speeds, the result will be similar to that described for error type 305 of FIG. 3. The braking torque will have high peak values that to a large extent balance each other, causing a brake torque that is some 10 times lower than the full power torque of the motor. The fuses will break if an internal phase short circuit affects more than one coil. For example, the short illustrated as 302 in FIG. 3 affects all the three coils W4–W6 and would at high speeds cause large currents to flow through the coils W4–W6 and therefore cause a fuse like 401 to open. In this way, a single fault insulation breakdown in a phase will in the worst case cause a short that will create local heating and brake torque from one single stator pole coil. Compared to the short 302 indicated in FIG. 3, this will reduce the brake torque to a third or less. In the diagram of FIG. 9 the emf E in coils W4–6, the brake torque T, and the current I are shown for the example motor in a case where the complete coil group W4–6 has been shorted. For the example of the figure is assumed that the insulation between turns in the coils has not broken at the high long term temperature of 365° C. and that there are no fuses like 401.

If the short covers only a fraction of the coils W4–W6, the controller 403 will note a largely distorted current response from the current sensor 303 and/or a higher temperature detected by the temperature sensor 402. The normal action is to reduce or eliminate the currents through the coils W4–W6 by changing the switch pattern for switches T1–T4. The temperature of the shorted coil can reach very high levels, in the example motor some 370° C. at 3000 rpm when a most disadvantageous part of one coil is shorted. As the adjacent coils have no current and only the relatively low and smooth voltage from the emf caused by the rotation of the rotor, the stress on their insulation is low. This is important as the dielectric strength of high performance insulation materials decreases rapidly at high temperatures. The high voltage transient from the switches appears only in the torque creating coils in the other pole groups, which are thermally screened by the intermediate poles like 203.

Shorts within a winding coil are serious as they can easily create local hot spots that are hot enough to destroy the insulation of adjacent turns in a coil. A highly reliable motor system can be designed so that it can give the required power even if for example a single internal coil short according to a worst case occurs. To optimize the design, it is important to distinguish between the temperatures that an insulation system can withstand during 20000 hours during normal conditions and the far higher temperature that it can withstand in a time period during which the system must work having a serious fault that generates heat. In an aircraft application this time may be 20 hours, i.e. the flight time from error identification alarm to landing. A design principle for an electric motor system based on this requirement could comprise the following steps:

determining the expected maximum time during which the system must be able to operate after identification of a fault condition, determining the maximum or limit temperatures that are permitted in different components during different operating conditions and possible also that give a negligible risk of additional failures occurring during the maximum time, calculating the maximum temperature caused in different parts of the motor system during each fault condition assuming that the motor system is to deliver necessary power, and dimensioning the system so that the required power can be maintained during the maximum time without surpassing the maximum temperatures in the case where a fault would occur.

Figures 11, 12:
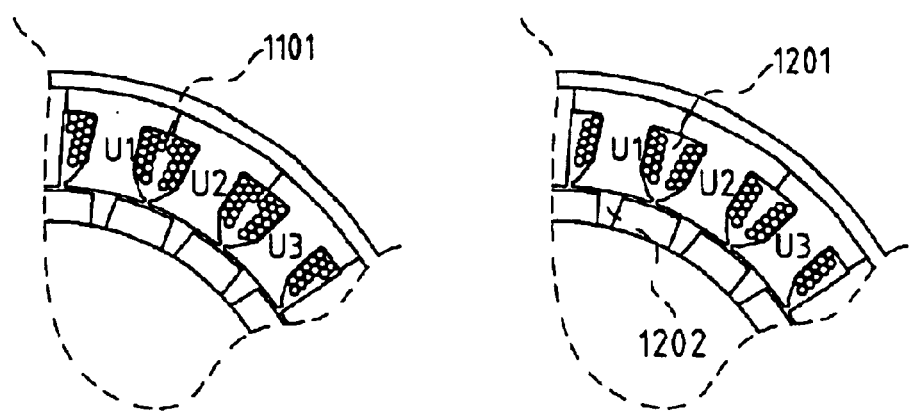
FIG. 11 is a sectional view of a brushless electric motor having high copper fill factor.
FIG. 12 is a sectional view of a brushless electric motor having increased coil ventilation channels.

In the case of internal coil shorts, an object of the invention is to ensure that the hot spot temperature is kept within limits that permits the insulation system of adjacent winding layers or turns to stay intact. FIGS. 11 and 12 show a design compromise to achieve this for a motor having internal ventilation. FIG. 1 shows a design where the copper filling of the stator slot is kept as high as possible using the wire diameter required. By removing the two wire turns shown at 1101, the performance of the motor system may suffer. On the other hand, the area of the ventilation channel is increased, permitting a better cooling of the coils and thereby permitting a higher rotor speed in the case where a coil obtains an internal winding short.

FIG. 12 also shows high permanent magnets. By keeping the magnets higher than necessary for normal operation, the ventilation area 1202 between magnets is increased and the internal flux weakening of the magnets due to stator currents decreases. This gives higher costs of manufacture but permits higher rotor speeds in the case of a shorted stator coil. A shorted stator coil will at high speeds give local heating with high power. Presently available magnet materials will give a lower flux at high temperatures and will more easily be permanently demagnetised at high stator currents at high temperatures. Cooling and demagnetisation margins of the rotor magnets are therefore important design criteria for high reliable motor systems.

Depending on the conditions given by the motor application, the speed of the motor can be reduced when a single coil short is detected so that the coil temperature can be kept at a level that reduces the risk that the heat from one internal coil short will cause secondary shorts within the same coil during the necessary operation life time from a detected fault to a service intervention. For the example motor, this is at some 2200 rpm with a hot spot temperature of some 290° C. and an average brake loss of some 10% of normal operation torque. In other applications, the system can be designed so that the normal operating speed gives a temperature rise in a shorted coil that is acceptable for the required operation life time from a detected fault to a service intervention.

Figure 5:
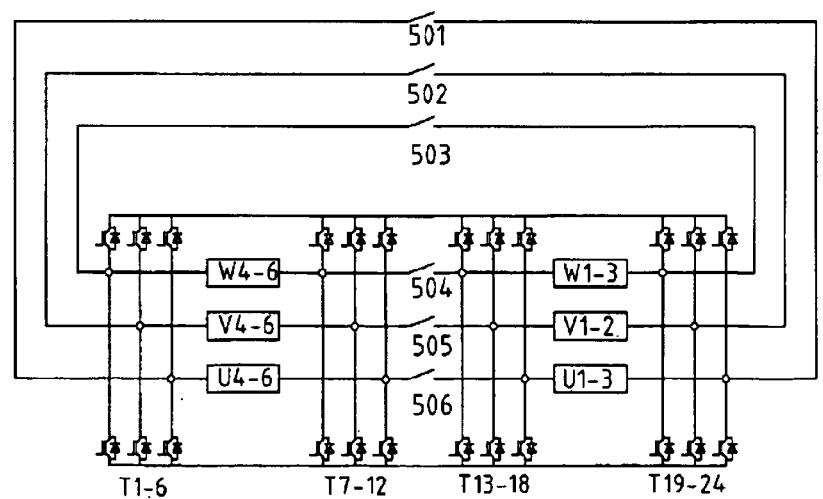
FIG. 5 is a circuit diagram similar to that of FIG. 3 but also having additional switches for protection/low speeds.

The circuit diagram of FIG. 5 illustrates a design of the switching circuitry and the phase windings having additional switches comprising two groups of triple switches 501–503 and 504–506. At high speeds, all switches 501–506 are non-conducting or open and the system operates as the system of FIG. 3. At low speeds, one of the two triple switch groups can be activated, i.e. all the switches in the group are closed or made to conduct. If the switches 504–506 are activated, the coils W4–6 and W1–3 are effectively connected in series as long as transistors T7–T18 are disabled. This permits the use of full currents in all phases but reduces the power switch losses to half, as 12 of the 24 power transistors are permanently disabled/open. It will also reduce the iron losses due to the current control switching as each pole group winding will face only half of the full rail voltage. It therefore permits substantial loss reduction, specially at low speeds. To obtain this advantage, only one set of triple switches such as 501–503 is necessary, and the switches 504–506 can then be deleted. It also permits the motor system to operate at full torque up to medium speeds even if a complete hex bridge, such as T7–T12, fails completely, for example if its internal control power system fails. Should hex bridge T1–T6 fail, switches 501–503 of the other group should be activated.

As is obvious for those skilled in the art, the design shown and described above can be varied in different ways.

The shown implementation uses six galvanically separated phase winding groups each driven by four switches as 4 hex switch modules. With reduced performance in fault operation, three coil groups with a total of 12 switches can be used. Another alternative is to have the six pole groups shown connected as two sets of normally Y-connected winding sets each driven by six switches as shown in FIG. 1. Obviously, the number of poles in each pole group and the number of pole groups can be varied.

Figure 10:
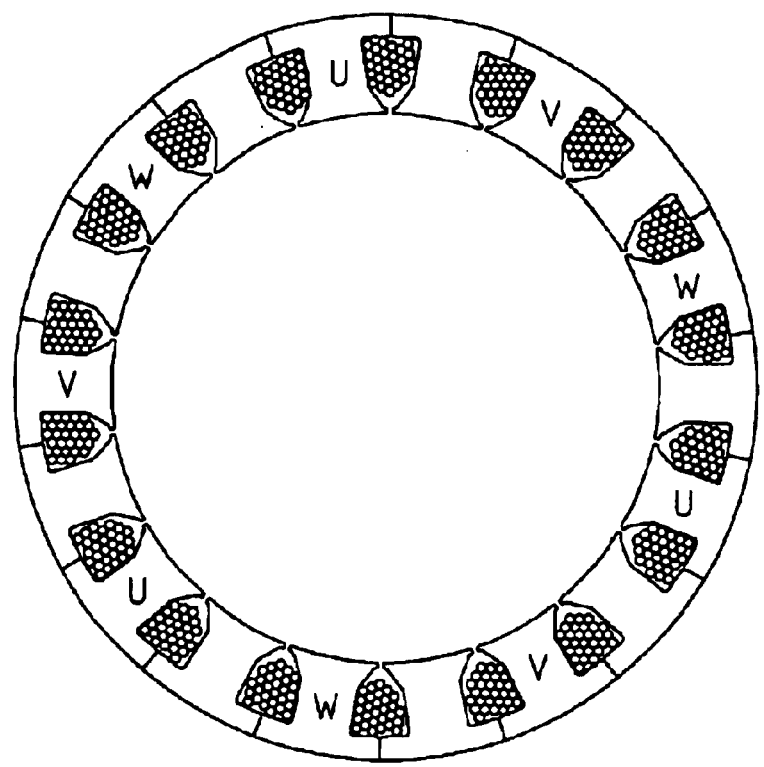
FIG. 10 is a sectional view of a brushless electric motor having high reliability according to a second embodiment.

The shown implementation arranges the thermal shielding between stator coils in the same pole group by unwound poles like the balancing poles disclosed in U.S. Pat. No. 5,442,250. An alternative way to obtain thermal shielding between coils belonging to different phases is shown in FIG. 10. In this case a prior art stator such as the one shown in U.S. Pat. No. 5,929,549 is modified so that every second stator pole winding is eliminated and the remaining coils have got almost twice the winding copper area. This solution creates a thermal shielding but will get larger winding ends, a higher thermal resistance from the outer layers to the stator iron pole and a higher risk of local shorts being spread as the possible shorted winding turns are buried deeper inside a winding.

The shown implementation has an internal rotor and external stator. Obviously an inverted arrangement as shown in the cited U.S. Pat. No. 5,442,250 can be used.

The shown implementation has a rotating rotor and corresponding stator. Obviously the principles shown can be applied also to linear motors comprising a linear stator and a member, a linear slide, that has permanent magnet poles and is movable in relation to the stator.

The shown implementation has slow fuses. Other high current limiting components such as PTC:s (Positive Temperature Coefficient devices) having very steep switch-over characteristics can be used in place of fuses.

The shown implementation has all the coils like W1–3 and all fuses for the groups connected in series with each other. Many other alternatives are possible, the other extreme being having each coil connected individually to the switch network through a fuse.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A brushless electric motor system comprising:
    a rotor or linear slide having north and south poles,
    a stator comprising poles and electrical phase windings, each phase winding including coils wound around the poles,
    a switching network comprising power switches intended to be connected to an electric power source and also connected to the windings, and
    a control device controlling the switching network to supply the phase windings with electric power at appropriate times in order to obtain a torque or force on and thereby a movement of the rotor or linear slide, characterized in that the coils of each phase winding have no metallic conductive connection with coils in the other phases, the switching network comprising for each phase at least one group of four power switches arranged in an H-configuration and connected between a positive conductor or rail intended to be connected to a positive terminal of the power source and a negative conductor or rail intended to be connected to a negative terminal of the power source.

2. A brushless electric motor system according to claim 1, characterized in that the coils of each phase winding are divided into winding groups, each winding group having no metallic conductive connection with other winding groups, the switching network comprising for each winding group four power switches arranged in an H-configuration between the positive conductor or rail and the negative conductor or rail.

3. A brushless electric motor system comprising:
a rotor or linear slide having north and south poles,
a stator comprising poles and at least two electrical windings, each winding including coils, each coil arranged around a single stator pole, each winding having no metallic connection with the other winding/s,
a switching network comprising power switches intended to be connected to an electric power source and also connected to the coils of the windings, and
a control device controlling the switching network to supply the windings with electric power at appropriate times in order to obtain a torque or force on and thereby a movement of the rotor or linear slide,
characterized in that each coil of each one of the windings is separated from the coils in the other winding/s by unwound stator poles.

4. A brushless electric motor system comprising:
a rotor or linear slide having north and south poles,
a stator or linear slide comprising poles and electrical phase windings, each phase winding including coils,
a switching network comprising power switches intended to be connected to an electric power source and also connected to the phase windings, and
a control device controlling the switching network to supply the phase windings with electric power at appropriate times in order to obtain a torque or force on and thereby a movement of the rotor or linear slide,
characterized in that each coil of each one of the phase windings is connected to other coils in the same phase winding and/or to the switching network through high current limiting devices, in particular fuses.

5. A brushless electric motor system according claim 4, characterized in that the coils of each phase winding are divided in at least two groups, the coils in one group having no metallic conductive connection with the coils in other groups.

6. A brushless electric motor system according to any of claims 1–5, characterized by a current sensor connected to the control device and sensing the current in each phase winding or in each winding group.

7. A brushless motor system according to any of claims 1–5, characterized in
that the switching network includes devices for sensing switched currents,
that the switching network and/or the control device is/are arranged to detect whether the magnitudes of the sensed switched currents exceed a safety level, and
that the control device is arranged to identify at least one fault condition including shorts in phase windings, shorts from phase windings to ground and failures of the power switches,
disable those of the power switches that drive phase windings or winding groups for which, in the coils or the power switches associated therewith, a fault condition has been identified, and
use still operating parts of the brushless motor system to ensure that the brushless motor system can operate to move the rotor or linear slide in spite of fault conditions albeit with reduced peak performance.

8. A brushless motor system according to any of claims 1–5, characterized in that the poles of the rotor or linear slide are derived from permanent magnets.

9. A brushless electric motor system according to any of claims 1–5, characterized by temperature sensors located close to at least one coil in each coil group, at least one individual temperature sensor having a relatively high resolution arranged for each coil group, the temperature sensors arranged to make measurements of the temperature of said at least one coil in each coil group.

10. A brushless electric system according to claim 9, characterized in that the control device is arranged to perform according to a control policy to optimise the performance of brushless electric motor system for fault conditions identified in system components using information from the temperature sensors to adjust, in particular increase the intensity of, still controllable currents flowing through phase windings and/or coil groups so that a maximum output power or maximum performance in regard of the torque or force is obtained without surpassing predetermined temperature limits.

11. A brushless electric motor system according to claim 10, characterized in that the predetermined temperature limits used are based on a relatively negligible risk for additional faults or failures of system components during an expected maximum time during which the brushless electric motor system must be able to operate after identifying one of the fault conditions.

12. A brushless electric motor system according to any of claims 1–5, characterized by additional switches connected between coil groups of each phase winding and controlled by the control device, one individual additional switch arranged for each phase winding and connected between conductor ends of two coil groups of the phase winding, the control device arranged to control the additional switches to be open in the case where no fault conditions has been identified and to control one of the additional switches to be closed in the case where a fault condition in an associated group of power switches have been identified, the associated group of power switches including those of the power switches that are connected to said conductor ends.

13. A brushless electric motor system according to claim 12, characterized in that the additional switches are connected between all the coil groups of each phase winding, one individual additional switch arranged for each coil group.

14. A brushless electric motor system according to any of claims 1–5, characterized by additional switches connected between coil groups of each phase winding and controlled by the control device, one individual additional switch arranged for each phase winding and connected between conductor ends of two coil groups of the phase winding, the control device arranged to control the additional switches to be open for high rotation speeds of the rotor or high movement speeds of the linear slide of the brushless electric motor system and to control all the additional switches to be closed for low rotation or movement speeds, the power switches of an associated group of power switches not being used for switching at the low rotation or movement speeds, the associated group of power switches including those of the power switches that are connected to said conductor ends.

15. A method of designing an electric motor system, characterized by the steps of:
- determining an expected maximum time during which the electric motor system must be able to operate after the identification of a fault condition,
- determining maximum temperatures permitted in different components of the electric motor system for different operating conditions and giving a negligible risk of additional fault conditions occurring in the electric motor system during the expected maximum time,
- calculating maximum temperatures caused in the different components of the electric motor system for each of the fault conditions assuming that the motor system is to deliver a desired power, and
- dimensioning the electric motor system so that the desired power can be delivered during the maximum time without exceeding the maximum temperatures in the case where one of the fault conditions would occur.

16. A method of designing an electric motor system, characterized by the steps of:
- determining an expected maximum time during which the electric motor system must be able to operate after the identification of each one of fault conditions possible to occur in the electric motor system and to still deliver a desired output power,
- determining maximum or limit temperatures permitted in different components of the electric motor system for different operating conditions of the electric motor system,
- calculating maximum temperatures caused in different parts of the electric motor system for each of the fault conditions, and
- dimensioning the electric motor system so that the desired power can be delivered during the expected maximum time without exceeding the determined maximum or limit temperatures in the case where one of the fault conditions would occur,
- wherein, in determining the maximum or limit temperatures, the maximum or limit temperatures are determined by the requirement that there should be a relatively negligible risk for additional faults occurring during the expected maximum time during which the electric motor system must be able to operate after an identification of one of the fault conditions.

* * * * *